United States Patent
Fukushima et al.

(10) Patent No.: US 7,617,676 B2
(45) Date of Patent: Nov. 17, 2009

(54) HYDRAULIC CONTROL APPARATUS FOR VEHICULAR FLUID-ACTUATED POWER TRANSMITTING DEVICE PROVIDED WITH LOCK-UP CLUTCH

(75) Inventors: Hiroshi Fukushima, Toyota (JP); Naoki Kato, Aichi-ken (JP); Kenichi Tsuchida, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 257 days.

(21) Appl. No.: 11/673,754

(22) Filed: Feb. 12, 2007

(65) Prior Publication Data

US 2007/0186981 A1 Aug. 16, 2007

(30) Foreign Application Priority Data

Feb. 13, 2006 (JP) .............................. 2006-035869

(51) Int. Cl.
*F16D 39/00* (2006.01)
(52) U.S. Cl. .......................................... 60/329; 60/337
(58) Field of Classification Search .................. 60/329, 60/337, 357; 192/3.28, 3.29, 3.3
See application file for complete search history.

(56) References Cited

U.S. PATENT DOCUMENTS

| | | | |
|---|---|---|---|
| 5,513,732 A | | 5/1996 | Goates |
| 5,746,170 A | * | 5/1998 | Moriya ................. 123/196 AB |
| 5,762,134 A | * | 6/1998 | Droste et al. .................. 60/337 |
| 5,772,519 A | * | 6/1998 | Feigler ..................... 464/68.41 |
| 6,419,059 B1 | * | 7/2002 | Nobu et al. ................... 192/3.3 |
| 6,944,529 B2 | * | 9/2005 | Person et al. .................. 701/51 |
| 2002/0128107 A1 | | 9/2002 | Wakayama |

FOREIGN PATENT DOCUMENTS

| JP | 64-6558 A | 1/1989 |
|---|---|---|
| JP | 64-55360 U | 4/1989 |
| JP | 7-54970 | 2/1995 |
| JP | 10-267115 | 10/1998 |
| JP | 2000-46156 A | 2/2000 |
| JP | 2002-213590 | 7/2002 |

* cited by examiner

*Primary Examiner*—Michael Leslie
(74) *Attorney, Agent, or Firm*—Oblon, Spivak, McClelland, Maier & Neustadt, L.L.P.

(57) ABSTRACT

A hydraulic control apparatus for a vehicular fluid-actuated power transmitting device provided with a lock-up clutch and an oil cooler, the lock-up clutch being operable between an engaged state and a released state according to a difference between pressures of a working fluid in an engaging fluid chamber and a releasing fluid chamber, the oil cooler being connected to a fluid passage communicating with the engaging and releasing fluid chambers, and operable to cool the working fluid, the hydraulic control apparatus including an oil cooler by-pass valve operable to permit the working fluid to by-pass the oil cooler, and a low-temperature by-pass device operable to open the oil cooler by-pass valve, for permitting the working fluid to by-passes the oil cooler, when a temperature of the working fluid is lower than a predetermined lower limit.

16 Claims, 5 Drawing Sheets

HYDRAULIC CONTROL APPARATUS FOR VEHICULAR FLUID-ACTUATED POWER TRANSMITTING DEVICE PROVIDED WITH LOCK-UP CLUTCH

The present application is based on Japanese Patent Application No. 2006-035869 filed Feb. 13, 2006, the contents of which are incorporated herein by reference.

BACKGROUND OF THE INVENTION

1. Field of the Invention

The present invention relates in general to a hydraulic control apparatus for a vehicular fluid-actuated power transmitting device provided with a lock-up clutch, and more particularly to improvements of a cooler by-pass valve used in the hydraulic control apparatus.

2. Discussion of the Related Art

In the field of an automotive vehicle including a fluid-actuated power transmitting device such as a torque converter or fluid coupling provided with a lock-up clutch, there is known a hydraulic control apparatus arranged to place the lock-up clutch in a slipping state for absorbing a periodic torque variation of an engine of the vehicle during running of the vehicle at a relatively low speed. A hydraulic control apparatus 200 shown in FIG. 5 is an example of such a known hydraulic control apparatus. This hydraulic control apparatus 200 includes: a solenoid-operated switching valve 202 operable to place a lock-up clutch 201 in a selected one of an engaged state and a released state; a lock-up relay valve 204 operable between two positions thereof in response to an operation of the solenoid-operated switching valve 202; a lock-up control valve 206 operable to control the engaged state of the lock-up clutch 201 by regulating the pressure of a working oil or fluid to be discharged from a fluid-actuated power transmitting device in the form of a torque converter 210, when the lock-up relay valve 204 is placed in the position for placing the lock-up clutch 201 in the engaged state; and a linear solenoid valve 208 operable to generate a pilot pressure which acts on a spool of the lock-up control valve 206, for controlling a pressure regulating operation of the lock-up control valve 206. The lock-up control valve 206 controls the engaged and released states of the lock-up clutch 201, and the slipping state which is a transient state between the engaged and released states.

The torque converter 210 is provided with a pump impeller 212 and a turbine impeller 214. While the lock-up clutch 201 is placed in the released state, the working fluid in the torque converter 210 is stirred or agitated by the pump and turbine impellers 212, 214, so that the temperature of the working fluid rises during an operation of the torque converter 210. To cool the heated working fluid, the hydraulic control apparatus 200 is provided with an oil cooler 216. The hydraulic control apparatus 200 is further provided with a cooler by-pass valve 218 for preventing a damage or any other trouble with the oil cooler 216 due to a rise of the pressure of the working fluid in an oil passage (e.g., cooler hose), which takes place due to partial plugging of the oil passage with impurities contained in the working fluid. When the pressure of the working fluid in the oil cooler 216 rises above a predetermined upper limit, the cooler by-pass valve 218 is opened to prevent a further flow of the working fluid into the oil cooler 216. JP-10-267115 A discloses a hydraulic control apparatus in which the cooler by-pass valve has different functions at different levels of the pressure of the working fluid, so that the number of the required components of the hydraulic control apparatus is reduced, whereby the cost of manufacture of the apparatus is accordingly reduced.

Usually, the working fluid has properties that permit the vehicle to be driven with a reduced amount of consumption of a fuel by the engine, when the temperature of the working fluid is held within a preferred range of about 80-90° C. In this respect, it is desirable to rapidly raise the temperature of the working fluid to a level within the preferred range, immediately after starting of the vehicle, for improving the fuel economy of the vehicle. However, the known hydraulic control apparatus as disclosed in the above-identified publication is arranged such that the cooler by-pass valve is controlled solely on the basis of the pressure of the working fluid, so that the working fluid is cooled by the oil cooler immediately after starting of the vehicle, namely, even while the temperature of the working fluid is still lower than the lower limit of the preferred range. Accordingly, the rise of the working fluid temperature is delayed after starting of the vehicle, unfavorably resulting in a failure to improve the fuel economy of the vehicle.

SUMMARY OF THE INVENTION

The present invention was made in the light of the background art discussed above. It is therefore an object of the present invention to provide a hydraulic control apparatus for a vehicular fluid-actuated power transmitting device provided with a lock-up clutch, which hydraulic control apparatus permits a rapid rise of the temperature of the working fluid from a low level immediate after starting of a vehicle.

The object indicated above may be achieved according any one of the following modes of the present invention. Each of these modes is numbered like the appended claims and depends from the other mode or modes, where appropriate, for easier understanding of the technical features disclosed in the present specification.

(1) A hydraulic control apparatus for a vehicular fluid-actuated power transmitting device provided with a lock-up clutch and an oil cooler, the lock-up clutch being operable between an engaged state and a released state according to a difference between pressures of a working fluid in an engaging fluid chamber and a releasing fluid chamber, the oil cooler being connected to a fluid passage communicating with the engaging and releasing fluid chambers, and operable to cool the working fluid, the hydraulic control apparatus being characterized by comprising: an oil cooler by-pass valve operable to permit the working fluid to by-pass the oil cooler; and a low-temperature by-pass device operable to open the oil cooler by-pass valve, for permitting the working fluid to by-passes the oil cooler, when a temperature of the working fluid is lower than a predetermined lower limit.

In the hydraulic control apparatus according to the above-described mode (1) of this invention, the oil cooler by-pass valve is opened to permit the working fluid to by-pass the oil cooler when the temperature of the working fluid is lower than the predetermined lower limit, The present hydraulic control apparatus permits a rapid rise of the temperature of the working fluid from a relatively low level to a level high enough to assure a high degree of fuel economy of the vehicle, during running of the vehicle immediately after starting of the vehicle, for example.

(2) The hydraulic control apparatus according to the above-described mode (1), wherein the low-temperature by-pass device includes: a clutch switching valve operable to place the lock-up clutch in a selected one of the engaged state and said released state; a solenoid-operated slip control valve operable to control the above-indicated difference between the pressures of the working fluid; and a control device operable to command the solenoid-operated slip control valve to generate a pilot pressure for opening the oil cooler by-pass valve when the lock-up clutch is placed in the releasing state by the clutch switching valve, and wherein the clutch switching valve includes a switching port through which the pilot pressure is applied to the oil cooler by-pass valve, for opening the oil cooler by-pass valve.

In the above-described mode (2), the low-temperature by-pass device includes the clutch switching valve, solenoid-operated slip control valve and control device. The control device commands the solenoid-operated slip control valve to generate the pilot pressure for opening the oil cooler by-pass valve when the lock-up clutch is placed in its released state by the clutch switching valve. The pilot pressure generated by the solenoid-operated slip control valve is applied to the oil cooler by-pass valve through the switching portion of the clutch switching valve, to open the oil cooler by-pass valve, for permitting the working fluid to by-pass the oil cooler. Thus, the solenoid-operated slip control valve is utilized to open the oil cooler by-pass valve when the temperature of the working fluid is lower than the predetermined lower limit while the lock-up clutch is in the released state. Accordingly, the number of the required components or elements of the hydraulic control device can be reduced.

(3) The hydraulic control apparatus according to the above-described mode (1), wherein the low-temperature by-pass device includes a solenoid-operated switching valve operable to generate a pilot pressure for opening the oil cooler by-pass valve, and a control device operable to command the solenoid-operated switching valve to generate the pilot pressure, and wherein the oil cooler by-pass valve is opened when the pilot pressure is applied to the oil cooler by-pass valve.

In the above-described mode (3), the solenoid-operated switching valve is provided exclusively for generating the pilot pressure for opening the oil cooler by-pass valve, to permit the working fluid to by-pass the oil cooler when the temperature of the working fluid is lower than the lower limit.

(4) The hydraulic apparatus according to any one of the above-described modes (1)-(3), wherein the oil cooler by-pass valve is opened to permit the working fluid to by-pass the oil cooler when a pressure of the working fluid in the oil cooler has been raised to a predetermined upper limit or higher, for preventing a rise of the pressure of the working fluid in said oil cooler beyond the predetermined upper limit.

In the above-described mode (4), the oil cooler by-pass valve functions to protect the oil cooler against a damage due to an excessively high pressure of the working fluid, as well as to permit the working fluid to by-pass the oil cooler when the temperature of the working fluid is lower than the predetermined lower limit.

(5) The hydraulic control apparatus according to the above-described mode (4), wherein the oil cooler by-pass valve includes a spool axially movable between an open position for opening the oil cooler by-pass valve and a closed position for closing the oil cooler by-pass valve, said spool having axially opposed surfaces which partially define a fluid chamber which have respective different pressure-receiving surface areas, the pressure-receiving surface area that receive the pressure of the working fluid in said fluid chamber in a valve-opening direction toward said open position being larger than the pressure-receiving surface area that receives the pressure of the working fluid in a valve-closing direction toward said closed position.

In the above-described mode (5), the pressure-receiving surface area of the spool of the oil cooler by-pass valve, which surface area receives the fluid pressure in the fluid chamber in the valve-opening direction is larger than the surface area which receives the fluid pressure in the valve-closing direction, so that the oil cooler by-pass valve is opened when the pressure of the working fluid in the oil cooler has been raised to the predetermined upper limit or higher. Thus, the oil cooler by-pass valve not only functions to permit the working fluid to by-pass the oil cooler when the working fluid temperature is lower than the lower limit, but also functions to protect the oil cooler against a damage due to an excessively high pressure of the working fluid as in the conventional hydraulic control apparatus.

(6) The hydraulic control apparatus according to the above-described mode (2), wherein the low-temperature by-pass device includes a temperature sensor operable to detect the temperature of the working fluid, and the control device includes a solenoid control portion operable to energize a solenoid of the solenoid-operated slip control valve to generate the pilot pressure, when the temperature of the working fluid detected by the temperature sensor is lower than the predetermined lower limit.

(7) The hydraulic control apparatus according to the above-described mode (3), wherein the low-temperature by-pass device includes a temperature sensor operable to detect the temperature of the working fluid, and the control device includes a solenoid control portion operable to energize a solenoid of the solenoid-operated switching valve to generate the pilot pressure, when the temperature of the working fluid detected by the temperature sensor is lower than said predetermined lower limit.

In the above-described mode (6) or (7), the temperature sensor is provided to accurately detecting the temperature of the working fluid, for assuring adequate control of the oil cooler by-pass valve to permit the working fluid to by-pass the oil cooler when the fluid temperature is lower than the lower limit.

(8) The hydraulic control apparatus according to the above-described mode (1), wherein the oil cooler by-pass valve includes a spool axially movable between an open position and a closed position for respectively opening and closing the oil cooler by-pass valve, and a shape-memory alloy spring for biasing the spool in a valve-closing direction toward the closed position, and the low-temperature by-pass device includes the shape-memory alloy spring, and wherein the shape-memory alloy spring has a shape at a temperature lower than the predetermined lower limit, which shape causes a biasing force of the shape-memory alloy spring to be smaller than a nominal value obtained at a temperature not lower than the predetermined lower limit, so that the spool is moved to the open position when the temperature of the working fluid is lower than the predetermined lower limit.

In the above-described mode (8), the oil cooler by-pass valve is opened by the pressure of the working fluid at a temperature of the working fluid lower than the predetermined lower limit, since the biasing force of the shape-memory alloy spring is smaller than the nominal value. When the temperature of the working fluid has been raised to the lower limit or higher, the shape-memory alloy spring normally functions to produce the nominal biasing force acting on the spool in the valve-closing direction. When the pressure of the working fluid in the oil cooler has been raised to a predetermined upper limit, the spool is moved to the open position against the biasing force of the shape-memory alloy spring, to thereby preventing an excessive rise of the pressure of the working fluid in the oil cooler, whereby the oil cooler is protected against a damage due to the excessively high pressure of the working fluid. Further, the low-temperature by-pass device can be easily provided by simply providing the oil cooler by-pass valve with the shape-memory alloy spring, namely, by merely replacing the conventional spring with the shape-memory alloy spring.

BRIEF DESCRIPTION OF THE DRAWINGS

The above and other objects, features, advantages and technical and industrial significance of the present invention will be better understood by reading the following detailed description of preferred embodiments of this invention, when considered in connection with the accompanying drawings, in which.

DETAILED DESCRIPTION OF THE PREFERRED EMBODIMENTS

Figure 1:
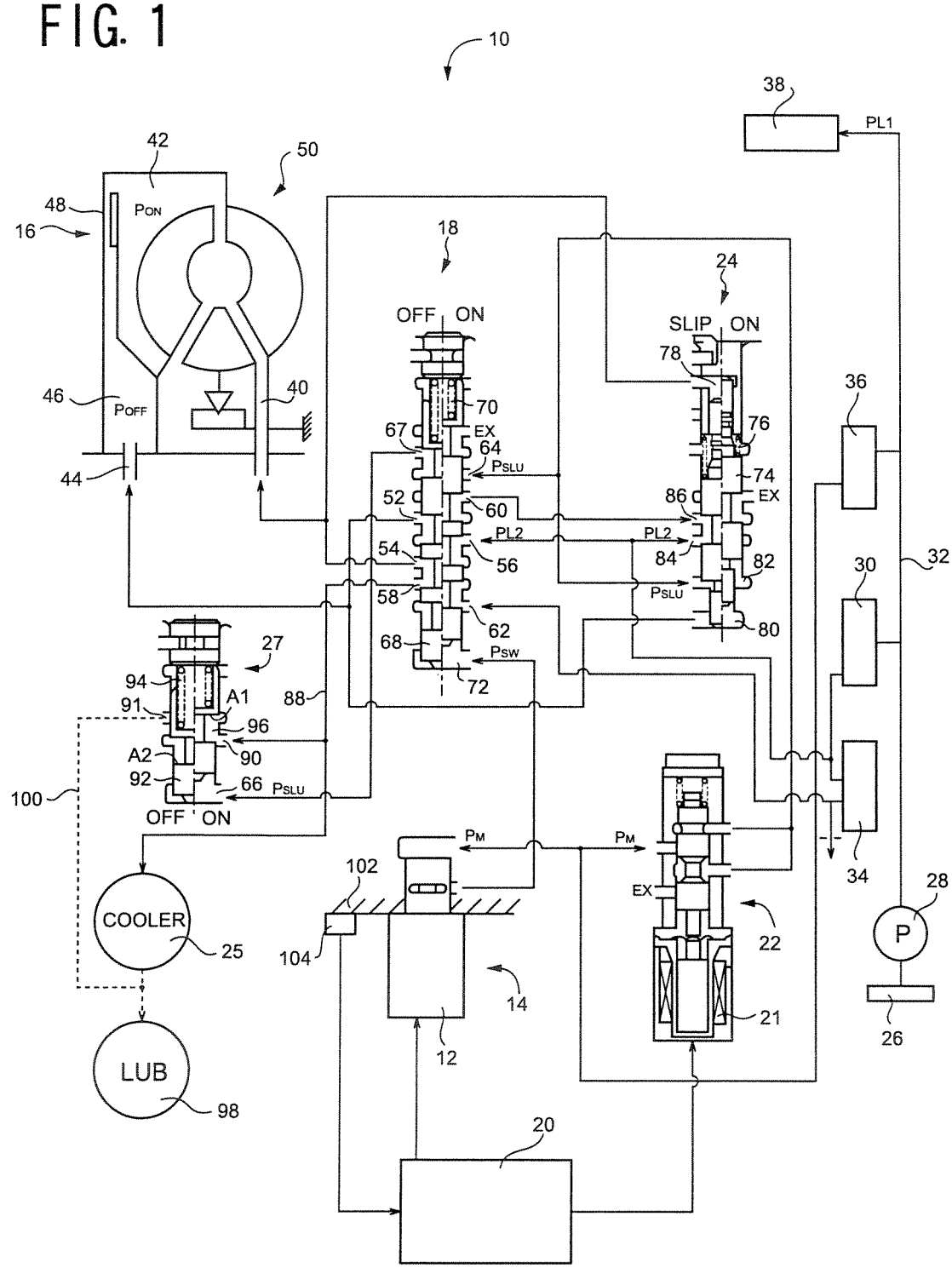
FIG. 1 is a view showing major elements of a hydraulic control circuit and an electronic control device which cooperate to provide a hydraulic control apparatus which is constructed according to a first embodiment of this invention, to control a vehicular fluid-actuated power transmitting device provided with a lock-up clutch.

Referring first to FIG. 1, there are shown a hydraulic control circuit 10 and an electronic control device 20 which cooperate with each other to provide a hydraulic control apparatus constructed according to the first embodiment of this invention, to control a vehicular fluid-actuated power transmitting device in the form of a torque converter 50 provided with a lock-up clutch 16. The torque converter 50 is disposed between an engine and an automatic transmission (not shown) of an automotive vehicle.

The hydraulic control circuit 10 includes: a solenoid-operated switching valve 14 provided with a switching solenoid 12 which is energized to generate a switching pilot pressure $P_{SW}$; a clutch switching valve 18 operable according to the switching pilot pressure $P_{SW}$, between a releasing position (OFF position) for placing the lock-up clutch 16 in its released state, and an engaging position (ON position) for placing the lock-up clutch 16 in its engaged state; a solenoid-operated slip control valve 22 having a solenoid 21 and operable to generate a pilot pressure $P_{SLU}$ corresponding to an amount of electric current supplied from the electronic control device 20; a lock-up control valve 24 operable to control the amount of slipping of the lock-up clutch 16 placed in its engaged state by the clutch switching valve 18; an oil cooler 25 of water or air cooling type operable to cool a working oil or fluid used by the hydraulic control circuit 10; and an oil cooler by-pass valve 27 operable when the pressure of the working fluid in the oil cooler 25 has been raised to a predetermined upper limit or higher, to permit the working fluid to by-pass the oil cooler 25, for thereby preventing a rise of the pressure of the working fluid in the oil cooler 25 beyond the predetermined upper limit. It will be understood that the clutch switching valve 18, electronic control device 20, solenoid-operated slip control valve 22, etc. cooperate to constitute a low-temperature by-pass device operable to open the oil cooler by-pass valve 27 for permitting the working fluid to by-pass the oil cooler 25 when the temperature of the working fluid is lower than a predetermined lower limit, as described below in detail.

The hydraulic control circuit 10 is provided with a strainer 26 to which the working fluid is returned, and a pump 28 driven by the engine to pressurize the working fluid sucked up from the strainer 26. The working fluid pressurized by the pump 28 is delivered to a first pressure regulating valve 30 in the form of a pressure relief valve, which regulates the pressure of the pressurized working fluid to a first line pressure PL1. The first pressure regulating valve 30 is operated according to an output pressure of a throttle-opening detector valve (not shown) provided to detect an angle of opening of a throttle valve (not shown) of the engine, so that the first line pressure PL1 generated in a first line pressure passage 32 corresponds to the output pressure of the throttle-opening detector valve. The working fluid discharged from the first pressure regulating valve 30 is delivered to a second pressure regulating valve 34 in the form of a pressure relief valve, which is also operated according to the output pressure of the throttle-opening detector valve, to regulate the pressure of the received working fluid to a second line pressure PL2 corresponding to an output torque of the engine. The first line pressure PL1 is applied to a third pressure regulating valve 36 in the form of a pressure reducing valve, which generates a predetermined modulated pressure $P_M$. The first line pressure PL1 is used by a shift control circuit 38 arranged to control a shifting action of the automatic transmission.

The lock-up clutch 16 is a hydraulically operated frictional coupling clutch having an engaging fluid chamber 42 to which the working fluid is supplied through an engaging passage 40, and a releasing fluid chamber 46 from which the working fluid is discharged through a releasing passage 44. The lock-up clutch 16 is brought into its engaging state in frictional contact with a front cover 48, according to a difference $\Delta P$ ($=P_{ON}-P_{OFF}$) between a pressure $P_{ON}$ of the working fluid in the engaging fluid chamber 42 and a pressure $P_{OFF}$ of the working fluid in the releasing fluid chamber 46. The torque converter 50 is operated in one of three operating states: a lock-up OFF state in which the lock-up clutch 16 is placed in its fully released state with a negative value of the pressure difference $\Delta P$; a slipping state in which the lock-up clutch 16 is placed in a partially engaged state (slipping state) with the zero value or a positive value of the pressure difference $\Delta P$; and a lock-up ON state in which the lock-up clutch 16 is placed in its fully engaged state with the maximum value of the pressure difference $\Delta P$. In the slipping state of the lock-up clutch 16 with the zero value of the pressure difference $\Delta P$, no torque acts on the lock-up clutch 16, so that the torque converter 50 is placed in a state substantially identical with the lock-up OFF state.

The clutch switching valve 18, which is provided to selectively placed the lock-up clutch 16 in its engaged or released state, has or includes: a releasing port 52 communicating with the releasing fluid chamber 46; an engaging port 54 communicating with the engaging fluid chamber 42; an input port 56 which receives the second line pressure PL2; a drain port 58 through which the working fluid is discharged from the engaging fluid chamber 42 when the lock-up clutch 16 is released, and through which the working fluid is discharged from the second pressure regulating valve 34 when the lock-up clutch 16 is engaged; a by-pass port 60 through which the working fluid is discharged from the releasing fluid chamber 46 when the lock-up clutch 16 is engaged; a relief port 62 to which the working fluid delivered from the second pressure regulating valve 34 is supplied; a pilot-pressure input port 64 to which the pilot pressure $P_{SLU}$ generated by the solenoid-operated slip control valve 22 is supplied when the lock-up clutch 16 is released; a pilot-pressure output port 67 communicating with a fluid chamber 66 of the oil cooler by-pass valve 27; a spool 68 axially movable to control states of communication of the above-indicated ports 52-67; a spring 70 biasing the spool 68 in a direction toward an OFF position; and a fluid chamber 72 which is partially defined by one end face of the spool 68 and which receives the switching pilot pressure $P_{SW}$ from the solenoid-operated switching valve 14, to produce a thrust force acting on the spool 68 in a direction toward an ON position. In FIG. 1, the spool 68 of the clutch switching valve 18 is shown such that a left half of the spool 68 on the left side of its centerline is located at the OFF position in which the lock-up clutch 18 is placed in the fully released state, while a right half of the spool 68 on the right side of the centerline is located at the ON position in which the lock-up clutch 18 is placed in its fully engaged state.

The lock-up control valve 24 has or includes: a spool 74; a spring 76 biasing the spool 74 in a direction toward a SLIP position (slipping position); a fluid chamber 78 which receives the pressure $P_{ON}$ in the engaging fluid chamber 42, to bias the spool 74 in the direction toward the SLIP position; a fluid chamber 80 which receives the pressure $P_{OFF}$ in the releasing fluid chamber 46, to bias the spool 74 in a direction toward an ON position (fully reengaging position); a fluid chamber 82 which receives the pilot pressure $P_{SLU}$, to bias the spool 74 in the direction toward the ON position; and an input port 84 which receives the second line pressure PL2 generated by the second pressure regulating valve 34; In FIG. 1, the spool 74 of the lock-up control valve 24 is shown such that a left half of the spool 74 on the left side of its centerline is located at the SLIP position, while a right half of the spool 74 on the right side of the centerline is located at the ON position.

The solenoid-operated slip control valve 22 is operable according to a command signal received from the electronic control device 20, to generate the pilot pressure $P_{SLU}$ for controlling the engaging pressure of the lock-up clutch 16 in its engaged state and for opening the oil cooler by-pass valve 27 when the lock-up clutch 16 is placed in the released state. The solenoid-operated slip control valve 22 reduces the modulated pressure $P_M$ received from the third pressure regulating valve 36, into the pilot pressure $P_{SLU}$ which is proportional to the amount of electric current applied thereto from the electronic control device 20. The solenoid-operated switching valve 14 also receives the modulated pressure $P_M$. When the switching solenoid 12 of the solenoid-operated switching valve 14 is in its de-energized or off state, the modulated pressure $P_M$ is not applied as the switching pilot pressure $P_{SW}$ from the switching valve 14 to the fluid chamber 72 of the clutch switching valve 18. When the switching solenoid 12 is in its energized or on state, the modulated pressure $P_M$ is applied as the switching pilot pressure $P_{SW}$ from the switching valve 14 to the fluid chamber 72.

When the switching pilot pressure $P_{SW}$ is applied from the solenoid-operated switching valve 14 to the fluid chamber 72 of the clutch switching valve 18, the spool 68 is moved to the ON position (engaging position), so that the second line pressure PL2 applied to the clutch switching valve 18 through the input port 56 is applied to the engaging fluid chamber 42 through the engaging port 54 and the engaging passage 40. Namely, the pressure $P_{ON}$ indicated above is equal to the second line pressure PL2 applied to the engaging fluid chamber 42. Under this condition, the releasing fluid chamber 46 is held in communication with the control port 86 of the lock-up control valve 24, through the releasing passage 44 and the releasing port 52 and by-pass port 60 of the clutch switching valve 18. The pressure $P_{OFF}$ in the releasing fluid chamber 46 is controlled by the lock-up control valve 24 to control the pressure difference $\Delta P$ ($=P_{ON}-P_{OFF}$), to control the amount of slipping of the lock-up clutch 16, that is, to control the slipping state of the lock-up clutch 16 within a range between the fully released state and the fully engaged state.

Described in detail, when the pilot pressure $P_{SLU}$ for moving the spool 74 of the lock-up control valve 24 toward the ON position is not applied to the fluid chamber 82 while the spool 68 of the clutch switching valve 18 is biased toward the ON position, that is, while the lock-up clutch 16 is placed in its engaged state, the spool 74 is moved to the SLIP position by the biasing force of the spring 76, whereby the second line pressure PL2 applied to the input port 84 is applied to the releasing fluid chamber 46 through the control port 86, the by-pass port 60 and releasing port 52 of the clutch switching valve 18, and the releasing passage 44. In this condition, the pressure difference $\Delta P$ is controlled according to the pilot pressure $P_{SLU}$ generated by the solenoid-operated slip control valve 22, and the slipping state of the lock-up clutch 16 is controlled.

When the pilot pressure $P_{SLU}$ for moving the spool 74 of the lock-up control valve 24 toward the ON position is applied to the fluid chamber 82 while the spool 68 of the clutch switching valve 18 is biased toward the ON position, the second line pressure PL2 is not applied from the input port 84 to the releasing fluid chamber 46, so that the working fluid is discharged from the releasing fluid chamber 46 through the drain port 58, whereby the pressure difference $\Delta P$ is maximized to place the lock-up clutch 16 in its fully engaged state.

While the lock-up clutch 16 is placed in the slipping state or fully engaged state, the spool 68 of the clutch switching valve 18 is located at its ON position in which the relief port 62 and the drain port 58 are held in communication with each other, so that the working fluid delivered from the second pressure regulating valve 34 is discharged through the drain port 58 into the cooling passage 88.

When the switching pilot pressure $P_{SW}$ is not applied to the fluid chamber 72 of the clutch switching valve 18, the spool 68 is held at the OFF position under the biasing action of the spring 70, so that the second line pressure PL2 applied to the input port 56 is applied to the releasing fluid chamber 46 through the releasing port 52 and the releasing passage 44, while the working fluid is discharged from the engaging fluid chamber 42 to the cooling passage 88 through the engaging passage 40, and the engaging port 54 and drain port 58 of the clutch switching valve 18, whereby the lock-up clutch 16 is brought into the fully released state.

The oil cooler by-pass valve 27 is opened upon reception of the pilot pressure $P_{SLU}$ from the solenoid-operated slip control valve 22. The oil cooler by-pass valve 27 has or includes: the above-indicated fluid chamber 66 which receives the pilot pressure $P_{SLU}$ acting in a valve-opening direction; a supply port 90 which receives the working fluid from the cooling passage 88; a by-pass port 91 through which the working fluid is discharged; a spool 92 axially movable between an open position and a closed position for respectively opening and closing the oil cooler by-pass valve 27, to control a state of communication of the supply port 90 and by-pass port 91; a spring 94 for biasing the spool 92 in a valve-closing direction; and a fluid chamber 96 formed between the supply port 90 and the by-pass port 91. The fluid chamber 96 is partially defined by axially opposed surfaces of the spool 92 which have different pressure-receiving surface areas A1 and A2 that receive the pressure of the working fluid in the fluid chamber 96 in the respective valve-opening and valve-closing directions. The surface area A1 receiving the fluid pressure in the valve-opening direction is larger than the surface area A2 receiving the fluid pressure in the valve-closing direction, so that the oil cooler by-pass valve 27 is opened when the pressure of the working fluid in the oil cooler 25 has been raised to a predetermined upper limit or higher. In FIG. 1, the oil cooler by-pass valve 27 is shown such that a left half of the spool 92 on the left side of its centerline is located at its OFF position (for the closed state of the vale 27) while a right half of the spool 92 on the right side of the centerline is located at its ON position (for the open state of the valve 27).

There will be described an operation of the oil cooler by-pass valve 27 of the hydraulic control circuit 10 constructed as described above, when the clutch switching valve 18 is placed in its ON position, that is, when the lock-up clutch 16 is placed in its slipping or fully engaged state. When the switching pilot pressure $P_{SW}$ generated by the solenoid-operated switching valve 14 is applied to the fluid chamber 72 of the clutch switching valve 18, the spool 68 is moved toward the ON position against the biasing force of the spring 70, so that the relief port 62 and the drain port 58 are brought into communication with each other. Accordingly, the working fluid delivered from the second pressure regulating valve 34 is fed into the oil cooler 25 through the relief port 62, drain port 58 and cooling passage 88, whereby the working fluid is cooled by the oil cooler 25. The thus cooled working fluid is supplied to lubricating points 98. When the pressure of the working fluid in the oil cooler 25 (in the cooler passage 88) has been raised to the predetermined upper limit or higher, the working fluid supplied to the fluid chamber 96 of the oil cooler by-pass valve 27 moves the spool 92 in the valve-opening direction against the biasing force of the spring 94 acting on the spool 92 in the valve-closing direction, owing to a difference (A1–A2) between the pressure-receiving surface areas A1 and A2. As a result, the supply port 90 and the by-pass port 91 are brought into communication with each other, so that the working fluid is discharged from the oil cooler by-pass valve 27 into a by-pass passage 100 which leads to the lubricating points 98, while by-passing the oil cooler 25. As described above, the oil cooler by-pass valve 27 is opened when the pressure of the working fluid in the oil cooler 25 has been raised to the predetermined upper limit or higher, and thus functions to protect the oil cooler 25 against a damage or any other trouble due to an excessive rise of the fluid pressure in the oil cooler 25. The above-indicated upper limit of the fluid pressure at which the oil cooler by-pass valve 27 is opened is determined by the biasing force (elastic force) of the spring 94 and the difference (A1–A2) between the pressure-receiving surface areas A1 and A2.

There will next be described an operation of the oil cooler by-pass valve 27 when the clutch switching valve 18 is placed in its OFF position, that is, when the lock-up clutch 16 is placed in its fully released state. When the switching pilot pressure $P_{SW}$ generated by the solenoid-operated switching valve 14 is not applied to the fluid chamber 72 of the clutch switching valve 18, the spool 68 is moved toward the OFF position by the biasing force of the spring 70, so that the engaging port 54 and the drain port 58 are brought into communication with each other. Accordingly, the working fluid discharged from the engaging fluid chamber 42 through the engaging passage 40 is fed into the oil cooler 25 through the engaging port 54, drain port 58 and cooling passage 88, whereby the working fluid is cooled by the oil cooler 25. The thus cooled working fluid is supplied to lubricating points 98. When the pressure of the working fluid in the oil cooler 25 has been raised to the predetermined upper limit or higher, the oil cooler by-pass valve 27 is opened to protect the oil cooler 25, as described above.

When the clutch switching valve 18 is placed in its OFF position, the pilot-pressure input port 64 and the pilot-pressure output port 67 are brought into communication with each other, so that the pilot pressure $P_{SLU}$ if generated by the solenoid-operated slip control valve 22 is applied to the fluid chamber 66 through the pilot-pressure input and output ports 64, 67, so that the spool 92 is moved in the valve-opening direction by the pilot pressure $P_{SLU}$, against the biasing force of the spring 94 acting on the spool 92 in the valve-closing direction, whereby the working fluid is discharged through the supply port 90 and by-pass port 91 into the by-pass passage 100 which by-passes the oil cooler 25. It will be understood that the pilot-pressure input port 64 and the pilot-pressure output port 67 of the clutch switching valve 18 cooperate to constitute a switching port which is opened only when the lock-up clutch is placed in its released state, to apply the pilot pressure $P_{SLU}$ to the oil cooler by-pass valve 27 for opening the oil cooler by-pass valve 27.

Figure 2:
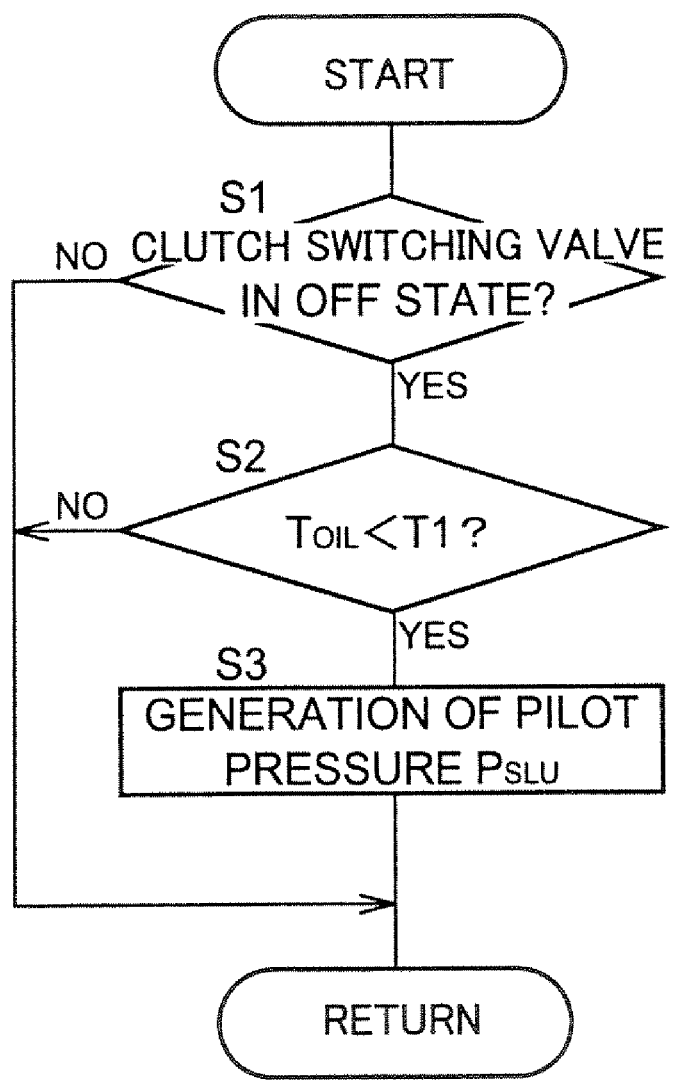
FIG. 2 is a flow chart illustrating a control routine executed by the electronic control device to control a solenoid-operated slip control valve for generating a pilot pressure $P_{SLU}$.

Referring next to the flow chart of FIG. 2, there will be described a control routine executed by the electronic control device 20 to control the solenoid-operated slip control valve 22 for generating the pilot pressure $P_{SLU}$. The control routine of FIG. 2 is initiated with step S1 to determine whether the clutch switching valve 18 is placed in its OFF state (with the spool 68 placed in its OFF position). If an affirmative determination is obtained in step S1, the control flow goes to step S2 to determine whether a temperature $T_{OIL}$ of the working fluid is lower than a predetermined lower limit T1 (e.g., about 10° C.). For example, the temperature $T_{OIL}$ is detected by a temperature sensor 104 provided on a valve body 102 of the automatic transmission (not shown). If an affirmative determination is obtained in step S2, that is, if the temperature $T_{OIL}$ of the working fluid is lower than the predetermined lower limit T1, the control flow goes to step S3 in which the electronic control device 20 applies a control signal to the solenoid 21 of the solenoid-operated slip control valve 22, so that the pilot pressure $P_{SLU}$ is generated by the slip control valve 22. As a result, the oil cooler by-pass valve 27 is opened so that the working fluid is fed from the opened oil cooler by-pass valve 27 into the by-pass passage 100, whereby the discharged working fluid by-passes the oil cooler 25. While the clutch switching valve 18 is placed in its ON state (with the spool 68 placed in its ON position), the pilot-pressure input port 64 is closed by the spool 68, so that the pilot pressure $P_{SLU}$ generated by the solenoid-operated slip control valve 22 is not applied to the oil cooler by-pass valve 27 through the clutch switching valve 18. It will be understood that the temperature sensor 104 cooperates with the above-described elements 18, 20 and 22 to constitute the low-temperature by-pass device operable to open the oil cooler by-pass valve 27 when the temperature $T_{OIL}$ of the working fluid is lower than the lower limit T1, and that a portion of the electronic control device 20 assigned to implement steps S1-S3 constitutes a solenoid control portion operable to energize the solenoid 21 of the solenoid-operated slip control valve 22 to generate the pilot pressure $P_{SLU}$, when the temperature $T_{OIL}$ of the working fluid detected by the temperature sensor 104 is lower than the predetermined lower limit T1.

As described above, the hydraulic control apparatus according to the present first embodiment described above is arranged such that the oil cooler by-pass valve 27 is opened to permit the working fluid to by-pass the oil cooler 25 when the detected temperature $T_{OIL}$ of the working fluid is lower than the predetermined lower limit T1, This arrangement permits a rapid rise of the temperature of the working fluid from a relatively low level to a level high enough to assure a high degree of fuel economy of the vehicle, during running of the vehicle immediately after starting of the vehicle, for example.

The present hydraulic control apparatus is also advantageous in that lubricating points within the transmission of the vehicle and centrifugal-pressure canceling chambers formed in frictional coupling devices within the transmission can be supplied with a sufficient amount of the working fluid which is discharged from the opened oil cooler by-pass valve 27 and which by-passes the oil cooler 25, while the temperature $T_{OIL}$ of the working fluid is lower than the predetermined lower limit T1, that is, while the working fluid has an excessively high viscosity, which causes an excessively high resistance to a flow of the working fluid through the oil cooler if the high-viscosity working fluid was introduced into the oil cooler 25.

In the present hydraulic control apparatus, the low-temperature by-pass device includes the clutch switching valve 18, solenoid-operated slip control valve 22 and electronic control device 20. The control device 20 commands the solenoid-operated slip control valve 22 to generate the pilot pressure $P_{SLU}$ for controlling the engaging pressure of the lock-up clutch 16 placed in its engaged state, and for opening the oil cooler by-pass valve 27 when the lock-up clutch 16 is placed in its released state by the clutch switching valve 18. Thus, the slip control valve 22 is utilized to open the oil cooler by-pass valve 27 when the temperature $T_{OIL}$ of the working fluid is lower than the predetermined lower limit T1. Accordingly, the number of the required components or elements of the hydraulic control apparatus can be reduced.

The present hydraulic control apparatus is further arranged such that the pilot-pressure input port 64 is closed by the spool 68 when the lock-up clutch 16 is placed in the slipping state or fully engaged state, that is, when the spool 68 of the clutch switching valve 18 is located at its ON position. This arrangement prevents the application of the pilot pressure $P_{SLU}$ to the oil cooler by-pass valve 27 while the lock-up clutch 16 is placed in its slipping or fully engaged state.

In the hydraulic control apparatus according to the present first embodiment, the pressure-receiving surface area A1 of the spool 92 of the oil cooler by-pass valve 27, which surface area A1 receives the fluid pressure in the fluid chamber 96 in the valve-opening direction is larger than the surface area A2 which receives the fluid pressure in the valve-closing direction, so that the oil cooler by-pass valve 27 is opened when the pressure of the working fluid in the oil cooler 25 has been raised to the predetermined upper limit or higher. Thus, the oil cooler by-pass valve 27 not only functions to permit the working fluid to by-pass the oil cooler 25 when the working fluid temperature is lower than the lower limit, but also functions to protect the oil cooler 25 against a damage due to an excessively high pressure of the working fluid as in the conventional hydraulic control apparatus.

In the present hydraulic control apparatus, the temperature sensor 104 is provided in the transmission connected to the fluid-actuated power transmitting device in the form of the torque converter 50. The fluid temperature $T_{OIL}$ accurately detected by the temperature sensor 104 assures adequate control of the oil cooler by-pass valve 27 to permit the working fluid to by-pass the oil cooler 25 when the fluid temperature is lower than the lower limit T1.

Figure 3:
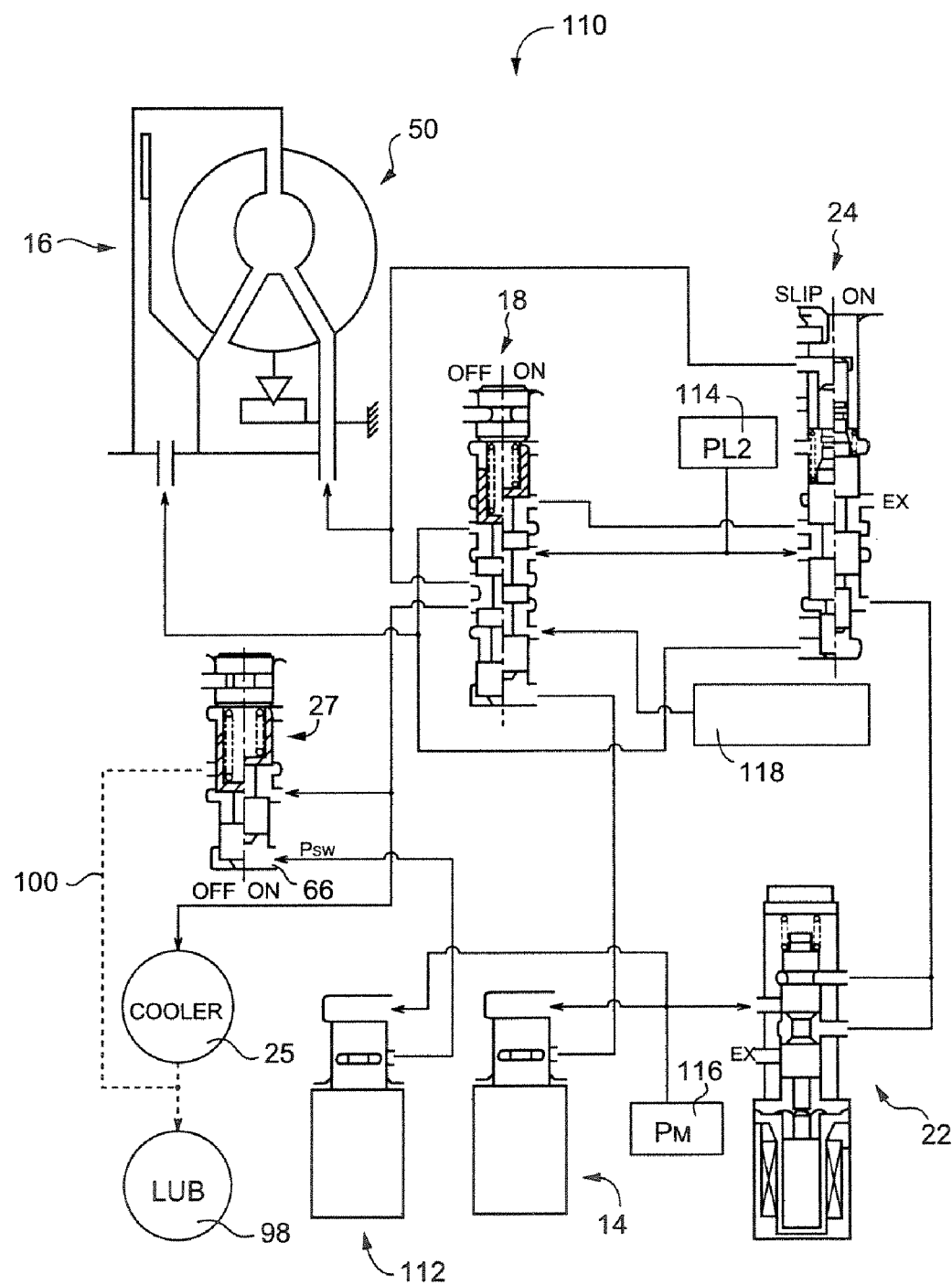
FIG. 3 is a view showing major elements of a hydraulic control circuit which cooperates with a control device to provide a hydraulic control apparatus for a vehicular fluid-actuated power transmitting device provided with a lock-up clutch, which hydraulic control apparatus constructed according to a second embodiment of this invention.
Figure 4:
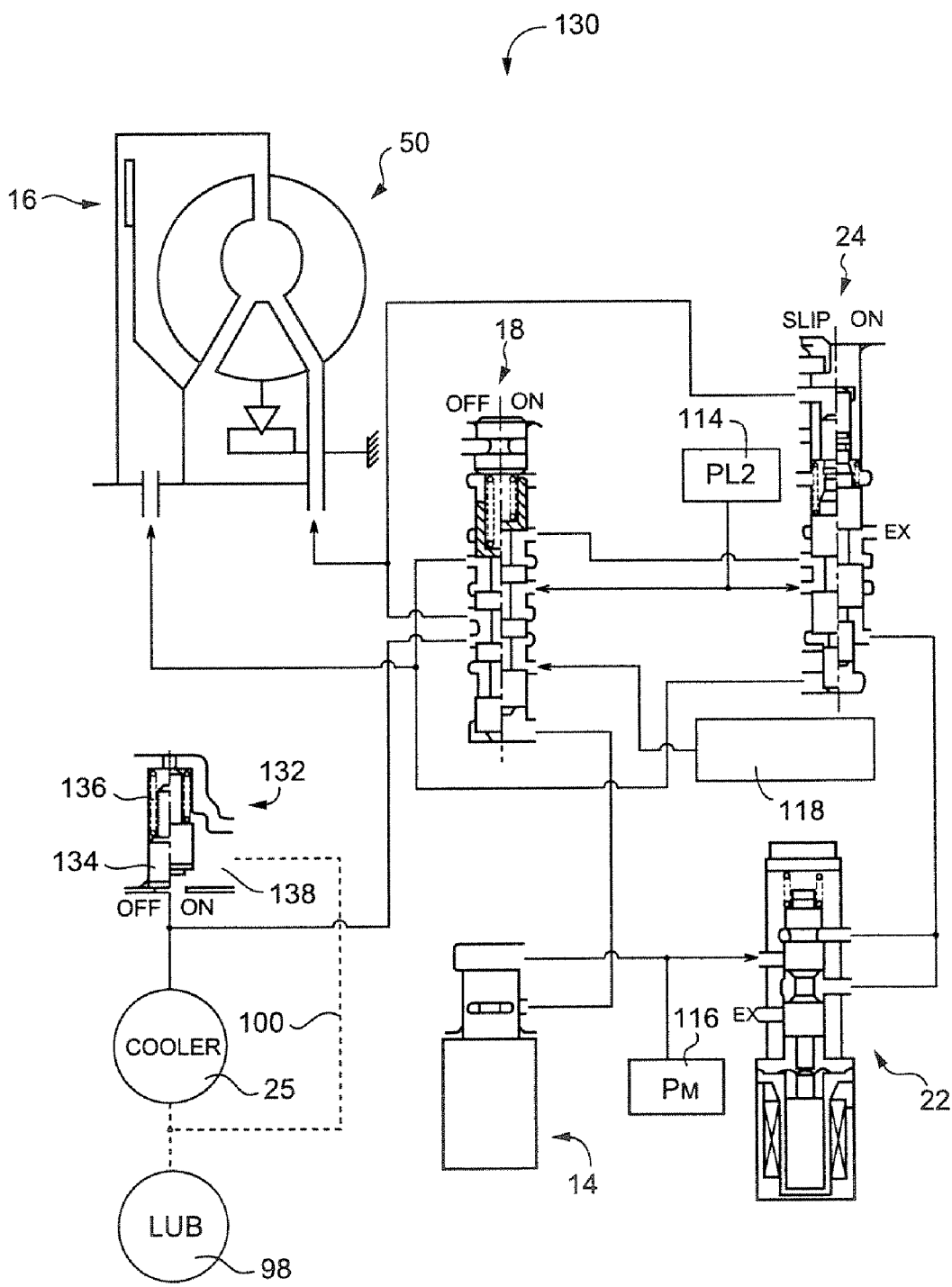
FIG. 4 is a view showing major elements of a hydraulic control circuit which cooperates with a control device to provide a hydraulic control apparatus constructed according to a third embodiment of the invention.
Figure 5:
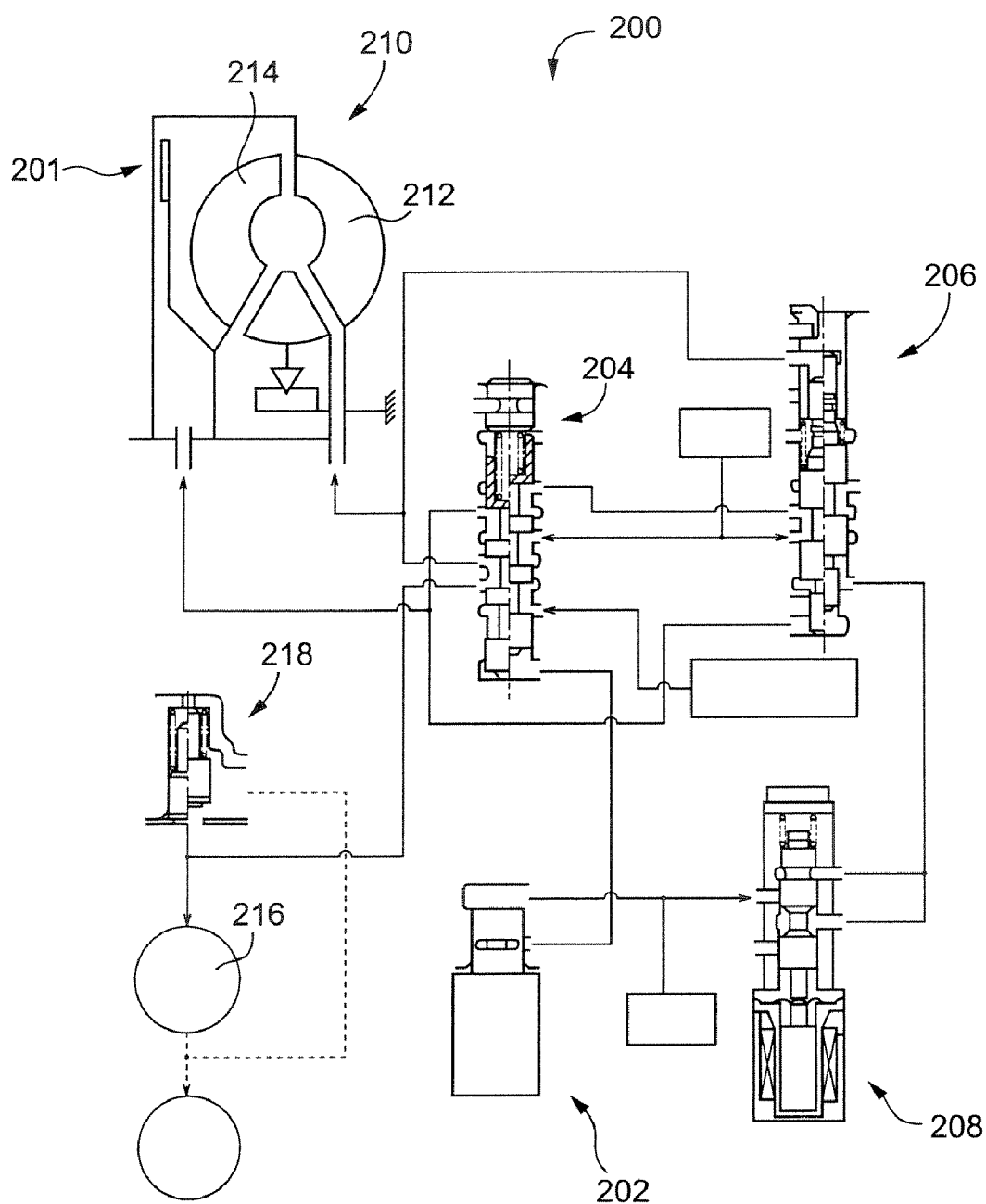
FIG. 5 is a view showing major elements of a hydraulic control circuit which cooperates with a control device to provide a known hydraulic control apparatus for a vehicular fluid-actuated power transmitting device provided with a lock-up clutch.

Referring next to FIGS. 3 and 4, other embodiments of this invention will be described. In FIGS. 3 and 4, the same reference signs as used in the first embodiment of FIGS. 1-2 will be used to identify the same elements, which will not be described redundantly.

FIG. 3 shows a hydraulic control circuit 110 which cooperates with the electronic control device 20 (shown in FIG. 1 but not shown in FIG. 3) to provide a hydraulic control apparatus for the fluid-actuated power transmitting device in the form of the torque converter 50 provided with the lock-up clutch 16, which hydraulic control apparatus is constructed according to a second embodiment of the present invention. In FIG. 3, the electronic control device 20, strainer 26, pressure regulating valves 30, 34, 36, etc. are not shown, but the hydraulic control circuit 110 includes the strainer, pressure regulating valves 30, 34, 36 and other hydraulic components shown in FIG. 1, and is controlled by the electronic control device 20. For convenience' sake, the second embodiment will be described such that the second line pressure PL2 is generated by a first supply portion 114, and the first line pressure PL1 is converted by a second supply portion 116 into the modulated pressure PM, while the pressure generated by the second pressure regulating valve 34 is applied to the clutch switching valve 18 through a third supply portion 118. In this respect, however, the present hydraulic control circuit 110 is substantially identical with the hydraulic control circuit 10 of FIG. 1.

The hydraulic control circuit 110 is different from the hydraulic control circuit 10, only in that the hydraulic control circuit 110 further includes a solenoid-operated switching valve 112. In this second embodiment, the oil cooler by-pass valve 27 is controlled according to the switching pilot pressure $P_{SW}$ generated by the solenoid-operated switching valve 112 under the control of the electronic control device 20. The switching valve 112 has a solenoid energized and de-energized by the electric control device 20. When the solenoid 12 of the solenoid-operated switching valve 112 is in its de-energized or off state, the modulated pressure $P_M$ generated by the second supply portion 116 is not applied as the switching pilot pressure $P_{SW}$ from the switching valve 112 to the fluid chamber 66 of the oil cooler by-pass valve 27. When the same solenoid is in its energized or on state, the modulated pressure $P_M$ is applied as the switching pilot pressure $P_{SW}$ from the switching valve 112 to the fluid chamber 66, to thereby open the oil cooler by-pass valve 27. It will be understood that the electronic control device 20, temperature sensor 104 and solenoid-operated switching valve 112 cooperate to constitute the low-temperature by-pass device operable to open the oil cooler by-pass valve 27 when the detected temperature of the working fluid is lower than the predetermined lower limit.

In the hydraulic control apparatus according to the second embodiment, the electronic control device 20 energizes the solenoid of the solenoid-operated switching valve 112 to generate the switching pilot pressure $P_{SW}$ when the temperature $T_{OIL}$ of the working fluid detected by the temperature sensor 104 is lower than the lower limit T1. In the present second embodiment, the solenoid-operated slip control valve 22 only functions to control the slipping state of the lock-up clutch 16 while the clutch switching valve 18 is placed in the ON state, and does not constitute a part of the low-temperature by-pass device.

As described above, the solenoid-operated switching valve 112 is provided exclusively for applying the switching pilot pressure $P_{SW}$ to the oil cooler by-pass valve 27 for opening this by-pass valve 27 when the detected temperature of the working fluid is lower than the lower limit. Since the solenoid-operated switching valve 112 is controllable independently of the solenoid-operated slip control valve 22, the oil cooler by-pass valve 27 can be opened as needed.

FIG. 4 shows a hydraulic control circuit 130 which cooperates with the electronic control device 20 (shown in FIG. 1 but not shown in FIG. 3) to provide a hydraulic control apparatus for the fluid-actuated power transmitting device in the form of the torque converter 50 provided with the lock-up clutch 16, which hydraulic control apparatus is constructed according to a third embodiment of the present invention. In FIG. 3, the electronic control device 20, strainer 26, pressure regulating valves 30, 34, 36, etc. are not shown, but the hydraulic control circuit 130 includes the strainer, pressure regulating valves 30, 34, 36 and other hydraulic components shown in FIG. 1, and is controlled by the electronic control device 20.

The hydraulic control circuit 130 is different from the hydraulic control circuit 10, only in that the hydraulic control circuit 130 includes an oil cooler by-pass valve 132, which does not receive the pilot pressure $P_{SLU}$ from the solenoid-operated slip control valve 22 or the switching pilot pressure $P_{SW}$ from the solenoid-operated switching valve 112. In FIG. 4, the oil cooler by-pass valve 132 is shown such that a left half of a spool 134 on the left side of its centerline is located at its closed position (OFF position), while a right half of the spool 134 on the right side of the centerline is located at its open position (ON position).

The oil cooler by-pass valve 132 has or includes: the above-indicated spool 134 axially movable between the open and closed positions for respectively opening and closing the oil cooler by-pass valve 132; a spring 136 which is formed of a shape-memory alloy and which biases the spool 134 in the valve-closing direction toward the closed position; and an oil chamber 138 which is partially defined by one axial end of the spool 134 remote from the spring 136 and which is supplied with the working fluid. The spring 136 of the shape-memory alloy has a shape at a temperature lower than the above-described lower limit T1 (e.g., about 10° C.), which shape causes a biasing force of the spring 136 to be lower than a nominal value obtained at a temperature not lower than the lower limit T1. Namely, the spring 136 does not normally function to bias the spool 134 in the valve-closing direction when the temperature of the working fluid is lower than the lower limit T1. When the temperature of the working fluid is lower than the lower limit T1, therefore, the spool 134 is moved to the open position by the pressure of the working fluid applied to the fluid chamber 138, so that the working fluid is discharged from the oil cooler by-pass valve 132 into the by-pass passage 100, whereby the working fluid by-passes the oil cooler 25. It will be understood that the spring 136 of the shape-memory alloy is a shape-memory alloy spring which serves as the low-temperature by-pass device operable to open the oil cooler by-pass valve 132 for permitting the working fluid to by-pass the oil cooler 25 when the temperature of the working fluid is lower than the predetermined lower limit T1.

In the hydraulic control circuit 130 according to the present third embodiment, too, the oil cooler by-pass valve 132 is opened when the temperature of the working fluid is lower than the predetermined lower limit T1. When the temperature of the working fluid has been raised to the lower limit T1 or higher, the spring 136 of the shape-memory alloy normally functions to produce the nominal biasing force acting on the spool in the valve-closing direction. When the pressure of the working fluid in the oil cooler 25 has been raised to a predetermined upper limit, the spool 134 is moved to the open position against the biasing force of the spring 136, whereby the oil cooler 25 is protected against a damage due to the excessively high pressure of the working fluid. Further, the low-temperature by-pass device can be easily provided by simply providing the oil cooler by-pass valve 132 with the shape-memory alloy spring 136, namely, by merely replacing the conventional spring with the shape-memory alloy spring 136.

While the several preferred embodiments of this invention have been described above in detail by reference to the drawings, it is to be understood that the present invention may be otherwise embodied.

In the illustrated first and second embodiments of FIGS. 1 and 3, the temperature sensor 104 is disposed in the valve body 102 within the automatic transmission of the vehicle. However, the temperature sensor 104 may be disposed at any other suitable position at which the temperature of the working fluid or oil can be detected.

In the illustrated embodiments, the lower limit T1 of the temperature $T_{OIL}$ of the working fluid which is used to open the oil cooler by-pass valve 27, 132 is about 10° C. However, the lower limit may be determined as needed.

In the illustrated embodiments, the oil cooler by-pass valve 27, 132 is arranged to be opened when the temperature of the working fluid has been lowered below the predetermined lower limit, or when the pressure of the working fluid in the oil cooler 25 has been raised to the predetermined upper limit. However, two oil cooler by-pass valves may be provided. In this case, one of the oil cooler by-pass valve is opened when the pressure of the working fluid in the oil cooler 25 has been raised to the predetermined upper limit, and the other oil cooler by-pass valve is opened when the temperature of the working fluid has been lowered below the predetermined lower limit.

It is to be understood that the present invention may be embodied with various other changes, modifications and improvements which may occur to those skilled in the art, in the light of the foregoing teachings.

What is claimed is:

1. A hydraulic control apparatus for a vehicular fluid-actuated power transmitting device provided with a lock-up clutch and an oil cooler, said lock-up clutch being operable between an engaged state and a released state according to a difference between pressures of a working fluid in an engaging fluid chamber and a releasing fluid chamber, said oil cooler being connected to a fluid passage communicating with said engaging and releasing fluid chambers, and operable to cool the working fluid, said hydraulic control apparatus by comprising:
    an oil cooler by-pass valve operable to permit the working fluid to by-pass said oil cooler; and
    a low-temperature by-pass device operable to open said oil cooler by-pass valve, that permits the working fluid to by-pass the oil cooler, when a temperature of the working fluid is lower than a predetermined lower limit, and
    wherein the low temperature by-pass device includes a control valve selectively operable to control an engaging pressure of the lock-up clutch and to open said oil cooler by-pass valve.

2. The hydraulic control apparatus according to claim 1, wherein the control valve is a solenoid-operated slip control valve operable to control said difference between pressures of the working fluid in the engaging fluid chamber and the releasing fluid chamber,
    wherein said low-temperature by-pass device includes, a clutch switching valve operable to place said lock-up clutch in a selected one of said engaged state and said released state, and a control device operable to command said solenoid-operated slip control valve to generate a pilot pressure to open said oil cooler by-pass valve when said lock-up clutch is placed in said releasing state by said clutch switching valve, and wherein said clutch switching valve includes a switching port through which said pilot pressure is applied to said oil cooler by-pass valve, to open the oil cooler by-pass valve.

3. The hydraulic control apparatus according to claim 1, wherein the control valve is a solenoid-operated slip control valve operable to generate a pilot pressure to open said oil cooler by-pass valve, wherein said low-temperature by-pass device includes a control device operable to command said solenoid-operated switching valve to generate said pilot pressure, and wherein said oil cooler by-pass valve is opened when said pilot pressure is applied to said oil cooler by-pass valve.

4. The hydraulic control apparatus according to claim 1, wherein said oil cooler by-pass valve is opened to permit the working fluid to by-pass said oil cooler when a pressure of the working fluid in said oil cooler has been raised to a predetermined upper limit or higher, that prevents a rise of the pressure of the working fluid in said oil cooler beyond said predetermined upper limit.

5. The hydraulic control apparatus according to claim 4, wherein said oil cooler by-pass valve includes a spool axially movable between an open position that opens the oil cooler by-pass valve and a closed position that closes the oil cooler by-pass valve, said spool having axially opposed surfaces which partially define a fluid chamber which have respective different pressure-receiving surface areas, the pressure-receiving surface area that receive the pressure of the working fluid in said fluid chamber in a valve-opening direction toward said open position being larger than the pressure-receiving surface area that receives the pressure of the working fluid in a valve-closing direction toward said closed position.

6. The hydraulic control apparatus according to claim 2, wherein said low-temperature by-pass device includes a temperature sensor operable to detect the temperature of the working fluid, and said control device includes a solenoid control portion operable to energize a solenoid of said solenoid-operated slip control valve to generate said pilot pressure, when the temperature of the working fluid detected by said temperature sensor is lower than said predetermined lower limit.

7. The hydraulic control apparatus according to claim 3, wherein said low-temperature by-pass device includes a temperature sensor operable to detect the temperature of the working fluid, and said control device includes a solenoid control portion operable to energize a solenoid of said solenoid-operated switching valve to generate said pilot pressure, when the temperature of the working fluid detected by said temperature sensor is lower than said predetermined lower limit.

8. The hydraulic control apparatus according to claim 1, wherein said oil cooler by-pass valve includes a spool axially movable between an open position and a closed position that respectively opens and closes the oil cooler by-pass valve, and a shape-memory alloy spring for biasing said spool in a valve-closing direction toward said closed position, and said low-temperature by-pass device includes said shape-memory alloy spring, and wherein said shape-memory alloy spring has a shape at a temperature lower than said predetermined lower limit, which shape causes a biasing force of the shape-memory alloy spring to be smaller than a nominal value obtained at a temperature not lower than said predetermined lower limit, so that said spool is moved to said open position when the temperature of the working fluid is lower than said predetermined lower limit.

9. The hydraulic control apparatus according to claim 1, wherein the control valve is a solenoid-operated slip control valve operable to generate a pilot pressure.

10. The hydraulic control apparatus according to claim 9, wherein the solenoid-operated slip control valve includes a solenoid, and wherein the pilot pressure is proportional to an electric current applied to the solenoid by a control device.

11. The hydraulic control apparatus according to claim 1, wherein the control valve is operable to control the engaging pressure when a clutch switching valve places said lock-up clutch in an engaged state, and wherein the control valve is operable to open the oil cooler by-pass valve when the clutch switching valve places said lock-up clutch in a disengaged state.

12. A hydraulic control apparatus for a vehicular fluid-actuated power transmitting device provided with a lock-up clutch and an oil cooler, said lock-up clutch being operable between an engaged state and a released state according to a difference between pressures of a working fluid in an engaging fluid chamber and a releasing fluid chamber, said oil cooler being connected to a fluid passage communicating with said engaging and releasing fluid chambers, and operable to cool the working fluid, said hydraulic control apparatus comprising:

an oil cooler by-pass valve operable to permit the working fluid to by-pass said oil cooler;

a low-temperature by-pass device operable to open said oil cooler by-pass valve, that permits the working fluid to by-pass the oil cooler, when a temperature of the working fluid is lower than a predetermined lower limit, wherein said low-temperature by-pass device includes, a clutch switching valve operable to place said lock-up clutch in a selected one of said engaged state and said released state, a solenoid-operated slip control valve operable to control said difference, and a control device operable to command said solenoid-operated slip control valve to generate a pilot pressure to open said oil cooler by-pass valve when said lock-up clutch is placed in said releasing state by said clutch switching valve, and wherein said clutch switching valve includes a switching port through which said pilot pressure is applied to said oil cooler by-pass valve, to open the oil cooler by-pass valve.

13. The hydraulic control apparatus according to claim 12, wherein said oil cooler by-pass valve is opened to permit the working fluid to by-pass said oil cooler when a pressure of the working fluid in said oil cooler has been raised to a predetermined upper limit or higher, that prevents a rise of the pressure of the working fluid in said oil cooler beyond said predetermined upper limit.

14. The hydraulic control apparatus according to claim 13, wherein said oil cooler by-pass valve includes a spool axially movable between an open position that opens the oil cooler by-pass valve and a closed position that closes the oil cooler by-pass valve, said spool having axially opposed surfaces which partially define a fluid chamber which have respective different pressure-receiving surface areas, the pressure-receiving surface area that receive the pressure of the working fluid in said fluid chamber in a valve-opening direction toward said open position being larger than the pressure-receiving surface area that receives the pressure of the working fluid in a valve-closing direction toward said closed position.

15. The hydraulic control apparatus according to claim 12, wherein said low-temperature by-pass device includes a temperature sensor operable to detect the temperature of the working fluid, and said control device includes a solenoid control portion operable to energize a solenoid of said solenoid-operated slip control valve to generate said pilot pressure, when the temperature of the working fluid detected by said temperature sensor is lower than said predetermined lower limit.

16. The hydraulic control apparatus according to claim 12, wherein said oil cooler by-pass valve includes a spool axially movable between an open position and a closed position that respectively opens and closes the oil cooler by-pass valve, and a shape-memory alloy spring for biasing said spool in a valve-closing direction toward said closed position, and said low-temperature by-pass device includes said shape-memory alloy spring, and wherein said shape-memory alloy spring has a shape at a temperature lower than said predetermined lower limit, which shape causes a biasing force of the shape-memory alloy spring to be smaller than a nominal value obtained at a temperature not lower than said predetermined lower limit, so that said spool is moved to said open position when the temperature of the working fluid is lower than said predetermined lower limit.

* * * * *